United States Patent
Vasudevan et al.

(10) Patent No.: US 12,277,327 B2
(45) Date of Patent: Apr. 15, 2025

(54) CONFIGURABLE STORAGE RESOURCE USAGE THROUGH A MULTI-PHASE DATA PROCESSING PIPELINE FOR DATA STORAGE EFFICIENCY

(71) Applicant: PAYPAL, INC., San Jose, CA (US)

(72) Inventors: Sreeram Vasudevan, Singapore (SG); George Chen Kaidi, Singapore (SG); Li Hua Lim, Singapore (SG); Vipul Jain, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/453,229

(22) Filed: Aug. 21, 2023

(65) Prior Publication Data
US 2025/0068342 A1 Feb. 27, 2025

(51) Int. Cl.
*G06F 3/06* (2006.01)
(52) U.S. Cl.
CPC .......... *G06F 3/0631* (2013.01); *G06F 3/0622* (2013.01); *G06F 3/0673* (2013.01)
(58) Field of Classification Search
None
See application file for complete search history.

(56) References Cited

U.S. PATENT DOCUMENTS

2014/0114936 A1* 4/2014 Araki ............... G06F 3/0608
707/693

FOREIGN PATENT DOCUMENTS

CN 117033487 A * 11/2023 ............ G06F 16/23

* cited by examiner

*Primary Examiner* — Brian R Peugh
(74) *Attorney, Agent, or Firm* — Haynes and Boone, LLP

(57) ABSTRACT

There are provided systems and methods for configurable storage resource usage through a multi-phase data processing pipeline for data storage efficiency. A service provider may provide online digital computing services, such as electronic transaction processing, account, and the like through online platforms and digital content that may be loaded and served on webpages and through applications of the service provider. The service provider may process and serve data, which may be stored in various data storages and databases of the service provider. The service provider may configure and optimize storage resource usage by processing data through a multi-phased processing pipeline that analyzes the data for reductions in data storage size, duplications, and/or storage times to convert data into a more efficient structure. This may include converting the data to smaller data pieces, deduplicating the same or similar data, or limiting storage in resource intensive data stores.

20 Claims, 9 Drawing Sheets

CONFIGURABLE STORAGE RESOURCE USAGE THROUGH A MULTI-PHASE DATA PROCESSING PIPELINE FOR DATA STORAGE EFFICIENCY

TECHNICAL FIELD

The present application generally relates to data storage and security and more particularly to providing dynamic content security policies to manage webpage data and other digital content loaded on external webpages using webpage element proxies.

BACKGROUND

An online service may provide services to users that may be associated with online shopping and transaction processing, such as electronic transaction processing on or through merchant websites and digital marketplaces. These service providers may make their products and services seamlessly available to merchants and through their merchant websites, which may require data to be stored so that they are available for future use and/or recordation. However, data processing and generating may produce "dark data" or data that may be single or limited use and never accessed again for use. This may require a significant amount of storage for large service providers and enterprise computing systems. Storage takes up space on disks and servers, as well as with cloud storage units, thereby adding cost and creating system and storage inefficiencies. This is further compounded by the issues that storage is not necessarily carbon neutral but may lead to greenhouse gas emissions due to power and system component requirements for data storage. However, it would be difficult for the service provider to set specific rules for data storage as data may have different intended purposes and/or needs, as data may include different information that has different storage requirements, whether user or service provider required, due to laws or regulations, and the like. For example, transaction histories may be required to be stored for a period of time, while personal data may also be required to be stored in certain manners for security purposes. As such, current data storage systems and mechanisms are not capable of overcoming this dilemma that results in wasted storage and unnecessary emissions. Thus, it is desirable for online transaction processors to implement data storage and security policies in a manner that is dynamic, efficient, and configurable while maintaining a high degree of data availability and retention.

Figure 1:
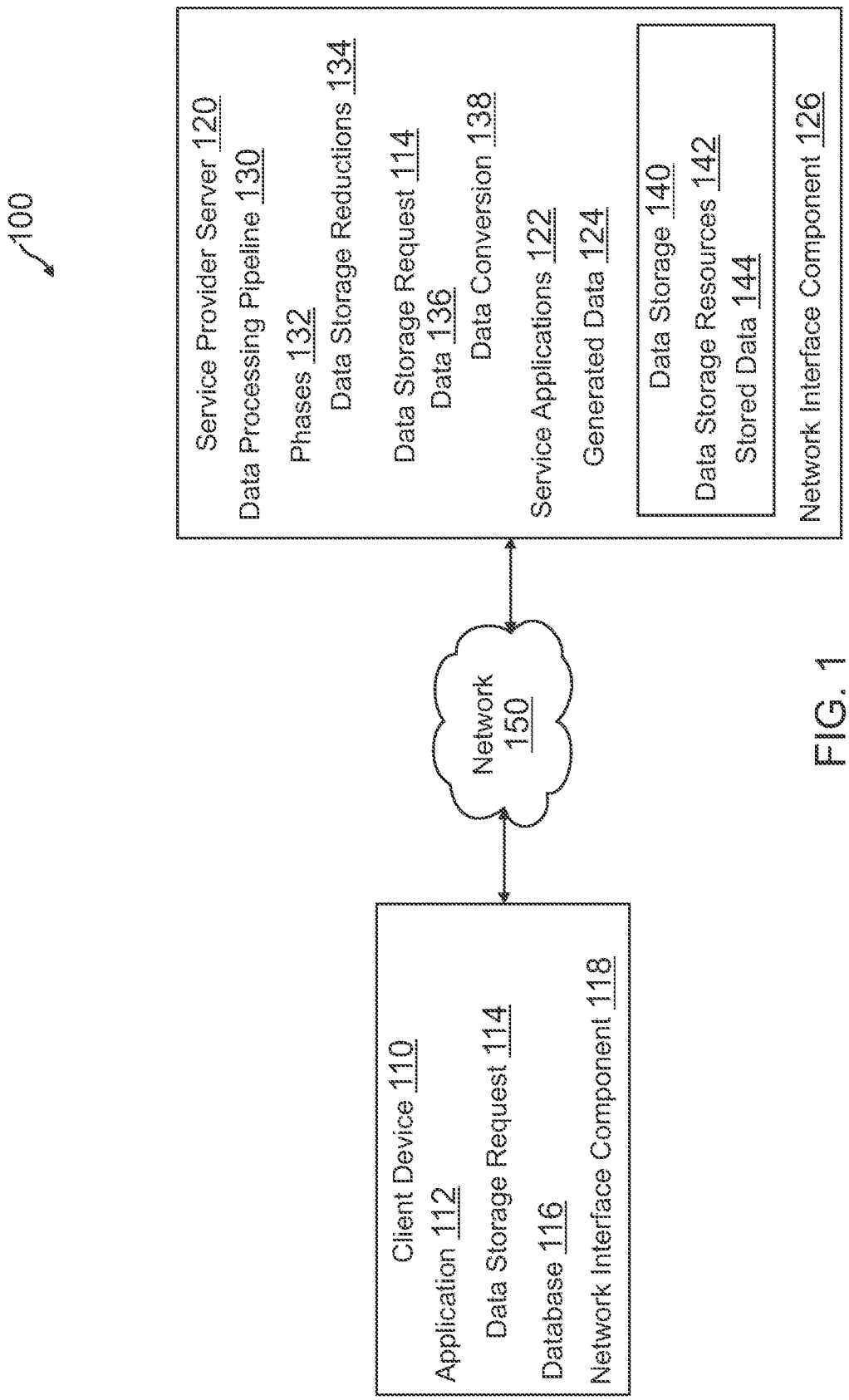
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for configurable storage resource usage through a multi-phase data processing pipeline for data storage efficiency. Systems suitable for practicing methods of the present disclosure are also provided.

An online transaction processor or other service provider may provide computing services, tools, and operations utilized when checking out and paying for transactions electronically on merchant websites and/or at merchant locations, as well as peer-to-peer and similar payment and transfer services. Such service providers may also or instead provide other computing services, such as those associated with social networking, microblogging, media sharing, messaging, business and consumer platforms, etc. In this regard, the service provider may provide online platforms and data to facilitate provision of these computing services, such as those webpages, online resources, and digital content hosted and/or provided by an online transaction processor (e.g., PAYPAL®, VENMO®, etc.). In order to process these transactions, a merchant may provide the computing services of the online transaction processor, which may process and store data for users' personal, account, and/or transaction history, as well as data for merchants and other sellers. Digital accounts of users with the online transaction processor (e.g., PAYPAL®, VENMO®, etc.) may provide electronic transaction processing services to users with one or more merchant in this manner, which may cause generation, processing, and storage of data by the service provider.

However, in order to provide computing services, the service provider may be required to generate, process, and store data, which introduces potential for "dark data" or data that is used once or a limited amount of time and stored, thereby wasting computing storage resources and causing system inefficiencies. Further, other types of data may be stored in inefficient manners or when not needed. To solve this problem with conventional computing architectures and digital data storage technologies, the service provider may implement a solution using a multi-phase data processing pipeline that determines different reductions in storage requirements, requests, and/or parameters for data storage requests and designations, which may correspond to data stored by or to be stored by the system, and thereafter converts the data to a more efficient data storage file, container, or object.

The multi-phase pipeline may operate to determine if a data size of the data may be reduced, such as by converting the data from one type or format of data to another, more efficient, storage size and data type. The pipeline may further operate to determine if the same or similar data exists and/or is referenced by other data storage objects and files, and whether combining references and/or overlapping or duplicate data may be performed. Finally, the pipeline may operate to determine if a reduction in a time period of length of time the data is stored, as well as where the data is stored for that time or may be deleted or moved from some or all storages, may be determined and used to move or delete data inefficiently stored by incorrect databases and components. This allows the online transaction processor or other service provider to implement a dynamic data storage policy that is changeable, efficient, and secure for data storage and retention while minimizing wasted resources due to dark data.

For example, a user may wish to create an online digital account, engage in digital account usage and/or electronic transaction processing, and/or process a purchase of one or more items in a transaction. Selection of one or more items during an online transaction with a merchant may require a payment instrument from the user for electronic transaction processing. A user may pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items. However, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. In this regard, the transaction processor or other online service provider may offer and provide computing services through data processing of account and transaction data for electronic transaction processing, as well as other data processing services for other use of computing services on websites, applications, or other online portals of the merchant. The transaction processor may provide one or more application programming interfaces (APIs), calls and call structures, integrations, and the like between different applications, microservices, decision services, and/or digital platforms of the transaction processor's system. The API integrations may allow for API calls and requests to be executed to track, request, and/or receive data from different platforms and operations of those platforms with merchant websites. However, these aforementioned processes may cause data generation for data that is only needed for a limited time or number of uses and/or lead to data processing that requires inefficient data storage and retention for data utilized by the system and/or of future use to the system.

As such and to address this problem, in some embodiments, the online service provider may provide a multi-phase data processing pipeline to minimize dark data in the service provider's systems and data stores, as well as optimize data storage usage. Data may enter the system through the aforementioned processes, where the data may have been generated from a data processing request and/or operations, as well as have been provided by a user, merchant, or third-party entity/data source. Exemplary dark data for online electronic transaction processors may include data that is duplicated, accessed for a limited amount of time or only in particular cases, and the like including transaction data, especially in the case of guest or unknown user checkouts and payments, compliance data and dockets that a risk team may need to access for a limited time or may be reused often and require only a single document, security logs, data retention of legal or audit purposes, and/or merchant data. Thus, data may enter the service provider's processing system and be stored and/or designated to be stored, which may invoke the multi-phase data processing pipeline to optimize storage use.

In a first phase of the data processing pipeline, the service provider may implement a smart capture and/or smart storage process to minimize or reduce storage size of data that is stored or requested to be stored. Smart capture may attempt to minimize the amount of data captured by only capturing that data that the user will utilize in the future, request in the future, or otherwise desire to be stored while not storing extra data unnecessarily captured at the same time. For example, the service provider may take input data, such as an image or text, and convert the data to a reduced or smart data file or object, such as text from an image or shorthand for text. With images, an algorithm may be implemented to utilize location-based intelligence to identify duplicate images or images that may have portions removed or substituted without overly affecting the underlying image and/or intent for storing the image. The algorithm may notify the user of overlapping images and/or suggest best quality images based on clarity or other image qualities.

Further, an image to text operation may be implemented with a descriptive artificial intelligence (AI) engine (e.g., a machine learning (ML) or neural network (NN) engine) to generate descriptions of images that allow an object library with a metadata generator to rebuild or replicate images when the description is stored in place of the image. Similarly, shorthand may be used to reduce the size of initial text, where an AI engine may reduce the size of the original text using shorthand with a description, metadata, symbols, a lexical library, and the like to rebuild the text from the shorthand. The first phase may therefore be utilized to shorten data in smaller and more efficient storage objects and/or containers through converting the data from one format, type, or the like to another.

The multi-phase data processing pipeline may further implement a second phase to reduce data storage resource usage and consumption and more efficiently store data through reducing duplicate data and data duplication, which may be caused by the same or similar data being stored by different data objects. This may occur where different data files utilize, act on, or otherwise have incorporated the same or similar data, such as a computing log during different security reviews, a user's account data by different transacting accounts, and the like. Based on an AI analysis of data usability and access patterns, such as data usage and access patterns learned or discovered using an ML or NN model, the service provider may determine if auto-referencing of the same or similar data may be performed by different data objects and/or containers, such as different files that may utilize the same or overlapping data. Thus, the service provider may determine if data may be stored differently by storing only the specific data for a data storage instance and referencing a common file that stored common data shared with other data storage instances.

If so, a common data object may be generated and/or extracted from the same or similar data shared between and/or referenced by different data objects. Any delta or change between the referencing objects may be applied on top to allow for changes between references. The duplicated data may be deleted by removing or marking for removal and/or cold storage (e.g., in a slow access or offline storage that utilizes less storage resource). Smart versions may be implemented to denote between minor and major versions of a file that has duplicate data from versioning and updates, which allows similar common data objects to be implemented. Side chains and an audit manager may be implemented to allow for permissions to be created to the common data and whether reference objects may access the common object. These may also allow for changes and loss to be handled between different referencing objects. A generative AI may provide generation of referencing objects data from the common data by rebuilding or generating the document from common links, referencing metadata, and the like.

Additionally, the multi-phase data processing pipeline may implement a third phase to limit or adjust time periods or lengths of time that data resides in storage (entirely, such as for wiping or deleting) and/or in particular storages before being moved to a colder storage with limited or slower data access times and availability. The third phase may utilize intelligent decision-making and insights based on evaluation of files in storage and/or to be stored to determine their current and/or assigned storage class (e.g., storage in hot, warm, cold, or ice designations, which may correspond to the storage resources used, access times, availability, bandwidth allotted for retrieve, and other parameters for storing data). The insights may be based on how often users or entities access the data including minimum and/or maximum access values over different time periods, a last access time, age of the data or object, and the like. Based on the insights, an AI engine may determine that certain data may be moved to colder storage when accessed less frequently and/or of less importance, thereby conserving storage resources. Further, common base data that is infrequently used may be moved to and stored in colder storage, which may assist by consuming fewer storage resources, while data that is being used retain high availability for access. This may include having data and/or files segmented by their access frequency and/or importance so that data being used and/or operated on may be quickly accessed while lower importance data that is less frequently accessed or operated on is moved to a storage that utilizes less resources. An ephemeral storage may be allowed for activities and data of low importance that is only stored temporarily and may be wiped of data intermittently and/or have data allotted short lifetimes in such storage. For example, cold data may include that data that is not operated on frequently, such as a user's static information, or old data that is not referenced often, such as a transaction history from far in the past (e.g., 3+ years ago). Hot data stored in a faster access storage may include recently stored and/or operated on data, such as a recent transaction history, user profile or information update, and the like.

Thus, the multi-phase data processing pipeline may implement the aforementioned components and phases so that when data enters the system, either newly as data for storage and during review of stored data, data storage may be optimized, and resources efficiently used. This further may allow for removal or storage of dark data in cold storage where it may not waste computing resources and lead to unnecessary carbon emissions. As such, service providers may manage their data storage and storage access and permissions in order to automate efficient storage and quickly review and change or update storage policies as needed. Thus, a service provider may provide for endpoint and computing service data stores and data storage processing in an efficient and coordinated manner, with improved security when requiring permissions for data access for fraud and data breach prevention. This may be done in an automated manner to provide faster and more efficient data storage systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110 and a service provider server 120 including a data storage 140 in communication over a network 150. User device 110 may be used to access and engage with data provided through applications and websites, such as the data provided by data storage 140. The data may be used for processes that generate transactions and/or process payments. Payments and electronic transaction processing may be facilitated through a payment platform, application, and/or application extension using digital accounts and processing operations of service provider server 120. Service provider server 120 may manage and efficiently store data in an optimized manner to minimize dark data with data storage 140 based on the following components and operations discussed herein.

User device 110 and/or service provider server 120 may each include or be executed using one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with service provider server 120 and/or websites corresponding to and provided by merchants and other entities using service provider server 120 for processing payments, transactions, and the like. User device 110 may correspond to an individual user, consumer, or entity that processes payments and electronic transaction processing services provided by service provider server 120. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains an application 112, a database 116, and a network interface component 118. Application 112 may correspond to executable processes, procedures, and/or applications with associated hardware. In other embodiments, user device 110 may include additional or different software as required.

Application 112 may correspond to one or more processes to execute modules and associated devices of user device 110 to provide a convenient interface to permit a user for user device 110 to view content and/or process data that may be provided and/or stored using data storage 140. For example, application 112 may enable the user to enter, view, and/or process items the user wishes to purchase in a transaction. In this regard, application 112 may correspond to specialized hardware and/or software utilized by user device 110 that may provide for website and/or resident software application item browsing, as well as transaction processing for the items. Viewing, browsing, and interacting may be done through one or more user interfaces of application 112 enabling the user to access item data and enter and/or view the items that the user associated with user device 110 wishes to purchase. This may be based on a transaction generated by application 112 using a merchant website. Application 112 may also be used by a user to provide payments and transfers to the merchant, such as using electronic transaction processing provided through computing services on service provider server 120.

For example, application 112 may utilize user financial information, such as credit card data, bank account data, or other funding source data, as a payment instrument when providing payment information. Additionally, application 112 may utilize a digital wallet associated with an account with service provider server 120 as the payment instrument, for example, through accessing a digital wallet or account of a user through entry of authentication credentials and/or by providing a data token that allows for processing using the account. Application 112 may also be used to receive a receipt or other information based on transaction processing. In this regard, data for item browsing, electronic transaction processing, login and authentication, payment and shipping, and the like may be generated and be required to be stored by service provider server 120, such as in data storage 140 based on data storage request 114. To optimize storage use and minimize dark data or other data that may be generated and requested to be stored by data storage request 114 and/or other devices, servers, and system components, service provider server 120 may utilize a multi-phase data processing pipeline as discussed herein. As such, data storage request 114 may be processed by service provider server 120 in this manner to efficiently store corresponding data for data storage request 114.

In various embodiments, application 112 may correspond to a general web browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website, including payment information for the transaction. Application 112 may correspond to a mobile web browser application, such as one provided on mobile smart phones including SAFARI® on iOS, Google CHROME®, and the like. However, in other embodiments, application 112 may include a dedicated software and/or mobile application of service provider system 120 or other entity, such as a merchant having a merchant marketplace or other application, interfaces, and platforms for item browsing and transaction processing. Application 112 may also provide other computing services, including social networking, microblogging, media sharing, messaging, business and consumer platforms, etc.

User device 110 may further include database 116 which may include, for example, identifiers such as operating system registry entries, cookies associated with application 112 and/or other applications, identifiers associated with hardware of user device 110, or other appropriate identifiers. Identifiers in database 116 may be used by a payment/service provider to associate user device 110 with a particular account maintained by the payment/service provider. Database 116 may also further store received transaction data, as well as processed transaction data.

User device 110 includes at least one network interface component 118 adapted to communicate with service provider server 120 and/or another device or server over network 150. In various embodiments, network interface component 118 may include an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for electronic transaction processing or other computing services discussed herein, as well as provide efficient and optimized data storage. Various embodiments of the system described herein may be provided by service provider server 120 and may be accessible by user device 110. In such embodiments, service provider server 120 may interface with user device 110 for providing computing services, which may generate data stored using a multi-phase data processing pipeline. Service provider server 120 includes one or more processing applications which may be configured to interact with user device 110 and/or data storage 140 during data processing and/or storage. In one example, service provider server 120 may be provided by PAYPAL®. However, in other embodiments, service provider server 120 may be maintained by or include another type of service provider.

Service provider server 120 of FIG. 1 includes a data processing pipeline 130, service applications 122, a data storage 140, and a network interface component 126. Data processing pipeline 130 and service applications 122 may correspond to executable processes, procedures, and/or applications with associated hardware. In other embodiments, service provider server 120 may include additional or different modules having specialized hardware and/or software as required.

Data processing pipeline 130 may correspond to one or more processes to execute modules and associated specialized hardware of service provider server 120 to provide data, operations, and processes to monitor and manage data storage and storage requests, including optimizing storage use and minimizing dark data stored by service provider server 120 in data storage 140. In this regard, data processing pipeline 130 may correspond to specialized hardware and/or software used by service provider server 120 to manage data storage 140 and data stored by data storage 140. In some embodiments, data processing pipeline 130 may correspond to an internal component and tool for data storage management and dark data minimization. In further embodiments, data processing pipeline 130 may correspond to a product of service provider server 120 that may be utilized by internal and/or external users, as well as computing services, to manage data with other internal and/or external data stores and databases. Data processing pipeline 130 may also include or utilize different processors, engines, or models as required for a multi-phase data processing pipeline for data storage management. Data processing pipeline may also provide or include one or more platforms that may be integrated through different API integrations to allow APIs of the platforms, services, and applications to exchange data. Data processing pipeline 130 may include one or more APIs that perform API calls and requests, and receive responses, in order to perform data storage management and optimization for storage use.

For example, data processing pipeline 130 may utilize a multi-phase data processing pipeline having phases 132 to process different data storage requests, including data storage request 114, which may determine data storage reductions 134 based on different data operations and conversions to optimize storage use and minimize dark data. Phases 132 may include a first phase having a first one of data storage reductions 134 to convert or format data from one data format or type to another, which may reduce a size of the data. The first phase may convert image data to text data and/or text data to shorthand, where a generative AI or other AI system may be used to both convert the data and restore data to their original form or recreation of the original form. This may be based on metadata and a library for description generation and/or substitution.

Phases 132 may further include a second phase that may be used to optimize storage of the same or similar data by reducing data duplication and/or performing data deduplication using data storage reductions 134. The second phase may identify the same or similar data that may be used and/or referenced by different data files or objects, and whether such shared data may be combined and/or referenced using a single or fewer data objects. The second phase may create references to the shared data by different data objects and establish permissions to access such data, as well as allow for versioning to determine versions of documents that may be deleted and have shared data. Permissions may be managed using a blockchain ledger having common objects referenced by different users. Additionally, a third phase of phases 132 may be used to reduce a length of time or time period that data is stored in data storage 140 and/or at a certain level or class (e.g., hot, warm, cold, etc. storage assignments or designations, which correspond to resources used to store and make available the data). During the third phase of phases 132, tracked data for how often objects and data is accessed, last time of access and/or when data is accessed, and other temporal data to determine, using data storage reductions 134, if data classes for storage may be downgraded to less resource intensive usage and/or deletion of old and/or uncommonly used data. Further, ephemeral data storage may be generated to store media and other data in a temporary manner with a countdown to deletion.

For example, on receipt of data storage request 114, phases 132 may be utilized to process data storage request 114 and corresponding data 136. Each of the three or more phases may be invoked to determine whether one or more of data storage reductions 134 may reduce a data size, a common data storage, and/or a data storage length, and implement data storage reductions 134 to convert, adjust, update, or change data 136 for data storage optimization. Data conversion 138 may be performed on data 136, which may result in a converted form, format, or type of data 136 for storage in data storage 140. Data 136 may correspond to new data, such as from new data processing events by client device 110 with service provider server 120, or previously stored data from data storage 140, such as during data storage management and review operations performed periodically. The operations and components of data processing pipeline 130 that interact with data storage 140 for optimizing storage use and minimizing stored dark data are discussed in further detail with regard to FIGS. 2-4 below.

Service applications 122 may correspond to one or more processes to execute modules and associated specialized hardware of service provider server 120 to process a transaction or provide another service to customers or end users of service provider server 120. In some embodiments, service applications 122 may be used by a user associated with user device 110 to establish a payment account and/or digital wallet, which may be used to process transactions. As such, service application 122 may be used by a user, merchant, or other entity establish an account and/or access an account with service provider server 120, for example, an account provided by PAYPAL® for engaging in use of transaction processing services. However, a more general account (e.g., a communication, payment, or other service account) may also provide account services and use of other computing services. In various embodiments, financial information may be stored to the account, such as account/card numbers and information. A digital token for the account/wallet may be used to send and process payments, for example, through an interface provided by service provider server 120. The payment account may be accessed and/or used through a web browser application/extension and/or dedicated payment application executed by user device 110 and engage in transaction processing through service applications 122. Service applications 122 may process the payment and may provide a transaction history to user device 110 for transaction authorization, approval, or denial. However, in other embodiments, service applications 122 may instead provide different computing services, including social networking, microblogging, media sharing, messaging, business and consumer platforms, etc.

Service applications 122 as may provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to more easily view and communicate information. In various embodiments, service applications 122 may include additional connection and/or communication applications, which may be utilized to communicate information to over network 150.

Additionally, service provider server 120 includes data storage 140, which may correspond to a data lake, data store, or other database system that may store data in one or more storage mediums for further retrieval, use, and/or processing. Data storage 140 may further store various identifiers associated with user device 110 and/or other devices and servers. Data storage 140 may also store account data, including payment instruments and authentication credentials, as well as transaction processing histories and data for processed transactions. Data storage 140 may store data associated with different data processing operations and events and may be optimized by data processing pipeline 130. For example, data storage resources 142 may include different databases, cloud storage components, and the like that may store data accessible by different components, devices, and servers. Data storage resources 142 may be optimized to maximizing available storage space and/or accessibility, while minimizing wasted resources due to storing dark data and the like. As such, stored data 144 may include data processed by data processing pipeline 130 and/or to be processed by data processing pipeline 130 to include converted data from phases 132 after application of data storage reductions 134.

In various embodiments, service provider server 120 includes at least one network interface component 126 adapted to communicate user device 110, data storage 140, and/or another device/server for a merchant directly and/or over network 150. In various embodiments, network interface component 126 may comprise an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
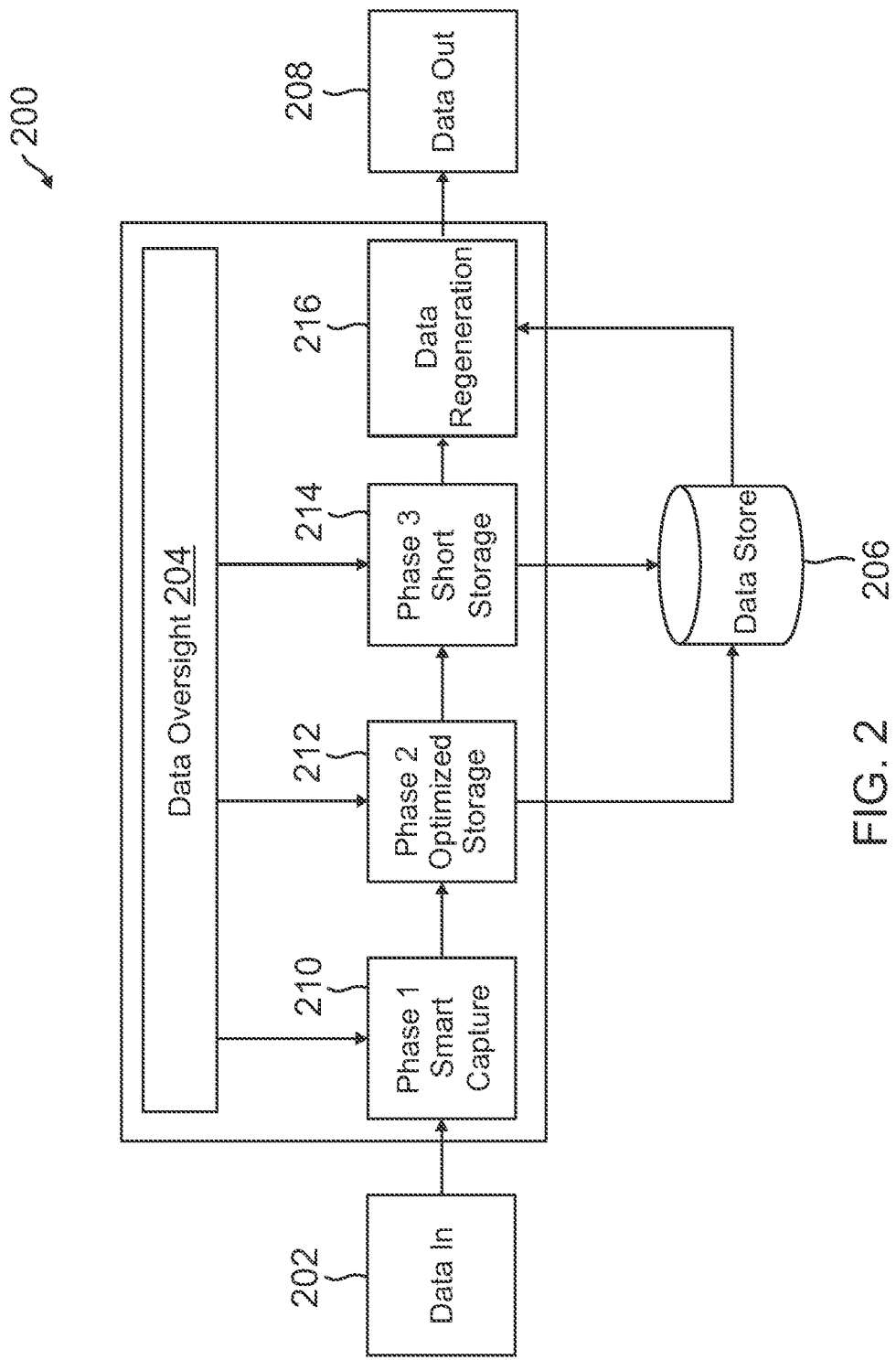
FIG. 2 is exemplary system diagram of a service provider that provides, manages, and utilizes a multi-phase data processing pipelines to enhance data storage efficiency through configurable data processing mechanisms and operations, according to an embodiment.

FIG. 2 is exemplary system diagram 200 of a service provider that provides, manages, and utilizes a multi-phase data processing pipelines to enhance data storage efficiency through configurable data processing mechanisms and operations, according to an embodiment. System diagram 200 includes operations that may be performed by a service provider when processing and storing data in an optimized storage usage manner, such as those performed by service provider server 120 when interacting with data storage 140 discussed in reference to system 100 of FIG. 1. In system diagram 200, service provider server 120 may include components for processing input data 202 using data oversight 204 to provide optimized data storage in a data store 206 using one or more data reduction operations to convert and/or adjust data prior to or after storage. Output data 208 may then be retrieved and provided by data oversight 204 after optimized data storage.

Data input 202 may correspond to data generated by a process and/or received by a system or component of the service provider, and therefore may be designated for storage or previously stored (e.g., when stored data is later analyzed for storage optimization) by one or more data storage systems and/or databases of the service provider. In this regard, data oversight 204 may correspond to a multi-phase data processing pipeline where input data 202 may be processed through different data processing phases for storage requirement reductions and optimizations. For example, during a phase one 210, smart capture operations may be executed to capture and/or convert captured data to a smaller data size, such as by exchanging images to text and/or text to shorthand. These operations may therefore seek to reduce an overall data size of stored data, including data that may be similar based on location and/or time (e.g., multiple of the same or similar image). Phase one 210 is discussed in further detail with regard to FIGS. 3A and 3B below. The data may then be further processed by data oversight 204.

During a phase two 212 of data oversight 212, optimized storage data operations may be executed to optimize storage of only a single set or object of particular data, or a minimal number of iterations of that data, in place of data duplication and storage with multiple data containers, objects, and/or files. For example, common data may referenced by multiple different events, files, and the like. In some embodiments, this may correspond to shared data between different data interactions and processing events or may correspond to the same or similar data shared between versions of a file. For example, common data may include static user data, such as a user's age or gender, which may be referenced by multiple different user activities, authentications, profiles, or the like. Phase two 212 may operate on input data 202 to reduce duplicate stored data and store more optimized data in data store 206. Phase two 212 is discussed in further detail with regard to FIG. 3C below. After processing by phase one 210 and phase two 212, converted and/or adjusted data from input data 202 may be stored in data store 206, such as a database, cloud storage unit, or the like.

Data oversight 204 may further utilize phase three 214 to adjust storage of data in data store 206 using short storage operations to minimize an amount of time data is stored and/or a class level that data is stored in for the amount of time (e.g., by downgrading to colder or less resource intensive storage data that is used infrequently). Phase three 214 may be executed with data when and after storing the data in order to adjust lengths of time and/or classifications of data storages or levels of storage for data in order to more efficiently store data based on required availability and/or data retention policies and requirements. As such, phase three 214 may interact with data store 206 to adjust data storage timelines. Phase three 214 is discussed in further detail with regard to FIGS. 3D and 3E below. Thereafter, data store 206 may be made available to a data regeneration operation 216 to regenerate, reconstruct, and/or retrieve data that may be required for further processes and entities. As such, data regeneration operation 216 may include a generative AI and/or operations to take data that may be compressed, converted to small data size, and the like and recreate such data. Once recreated, output data 208 may be provided to one or more processes based on the conversions by phase one 210, phase two 212, and/or phase three 214, as discussed with regard to FIGS. 3A-3E below.

Figure 3A:
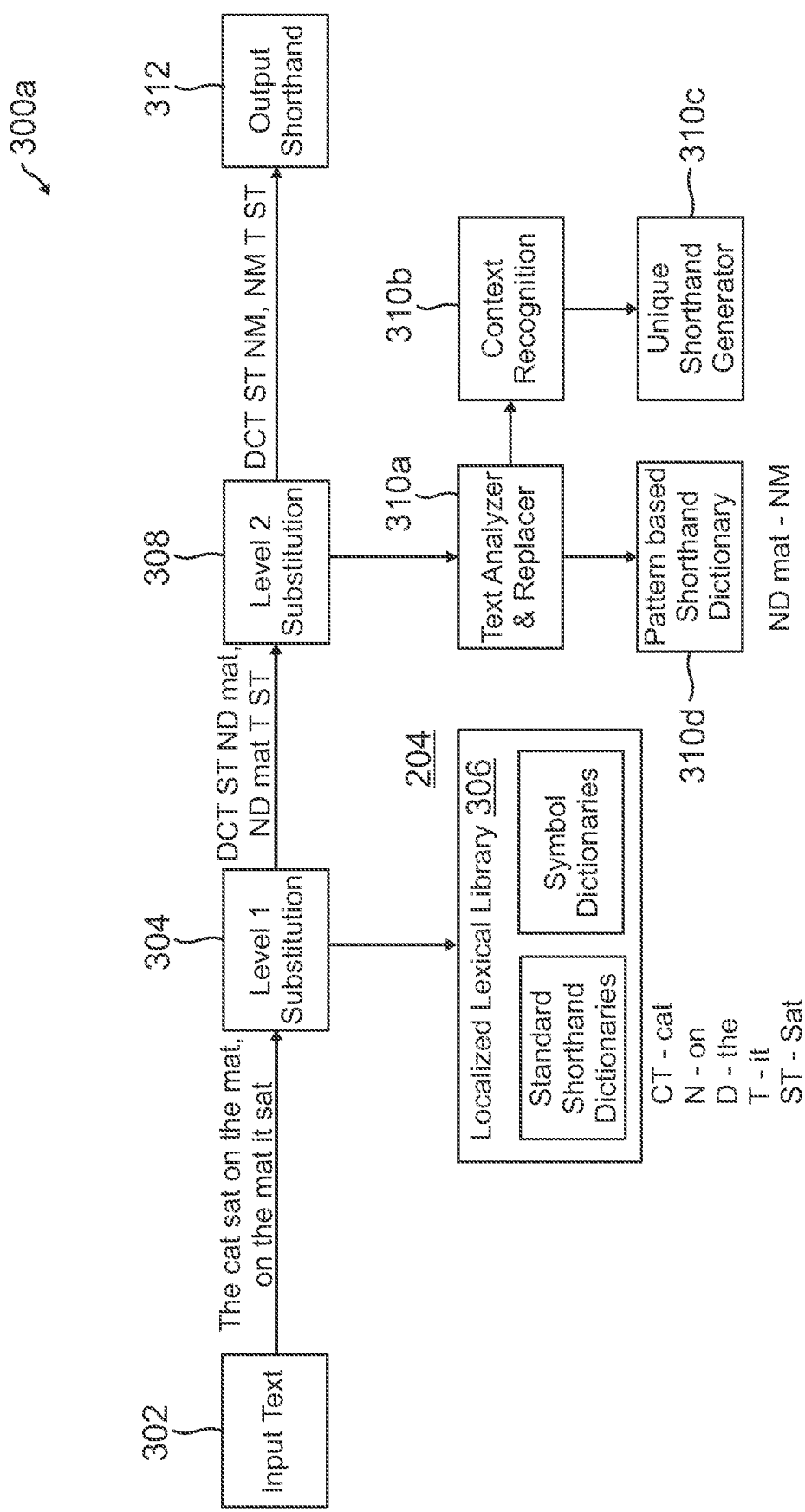
FIGS. 3A-3E are exemplary diagrams of different operations and components for phases of a multi-phase data processing pipelines to enhance data storage efficiency, according to an embodiment.

FIGS. 3A-3E are exemplary diagrams 300*a*-300*c* of different operations and components for phases of a multi-phase data processing pipelines to enhance data storage efficiency, according to an embodiment. Referring to FIG. 3A, diagram 300*a* is an exemplary process for converting input text 302 to output shorthand 312 using a first phase of a multi-phase data processing pipeline for storage usage optimization and dark data minimization. As such, the components, devices, and/or servers of service provider server 120 from system 100 of FIG. 1 of interact with data storage 140 to provide the storage optimization of input text in diagram 300*a*.

Diagram 300*a* represents a multi-level text replacement system for faster capturing and storing of input text 302 as output shorthand 312. In a level one substitution 304, text substitution is performed based on standard shorthand and symbols in a local lexical library 306. Local lexical library 306 may include a data, word or phrase, and/or software library that includes standard shorthand dictionary data (e.g., CT—cat, N—on, D—the, T—it, ST—sat, etc.) and symbol library data of commonly used shorthand and symbols that may replace text data. Level two substitution 308 is then performed on data from level one substitution 304 (e.g., by feeding the output from one layer to another), where text is again analyzed of data reduction. This may include a proprietary context recognition that generates unique shorthand that can be passed back to a text replacer so that text may be replaced, and entries added to a dictionary for text replacement and substitution. Level two substitution 308 may include a text analyzer and replace 310*a* that may perform the text substitution based on analyzed text data and shorthand, as well as proprietary context recognition. As such, text analyzer and replacer 310*a* may interact with a context recognition 310*c*, having a unique shorthand generator 310*c*, as well as a pattern-based shorthand dictionary 310*d*, to perform the text substitution. As such, by running back through level two substitution 308 to level one substitution 304, input text 302 may be retrieved.

Figure 3B:
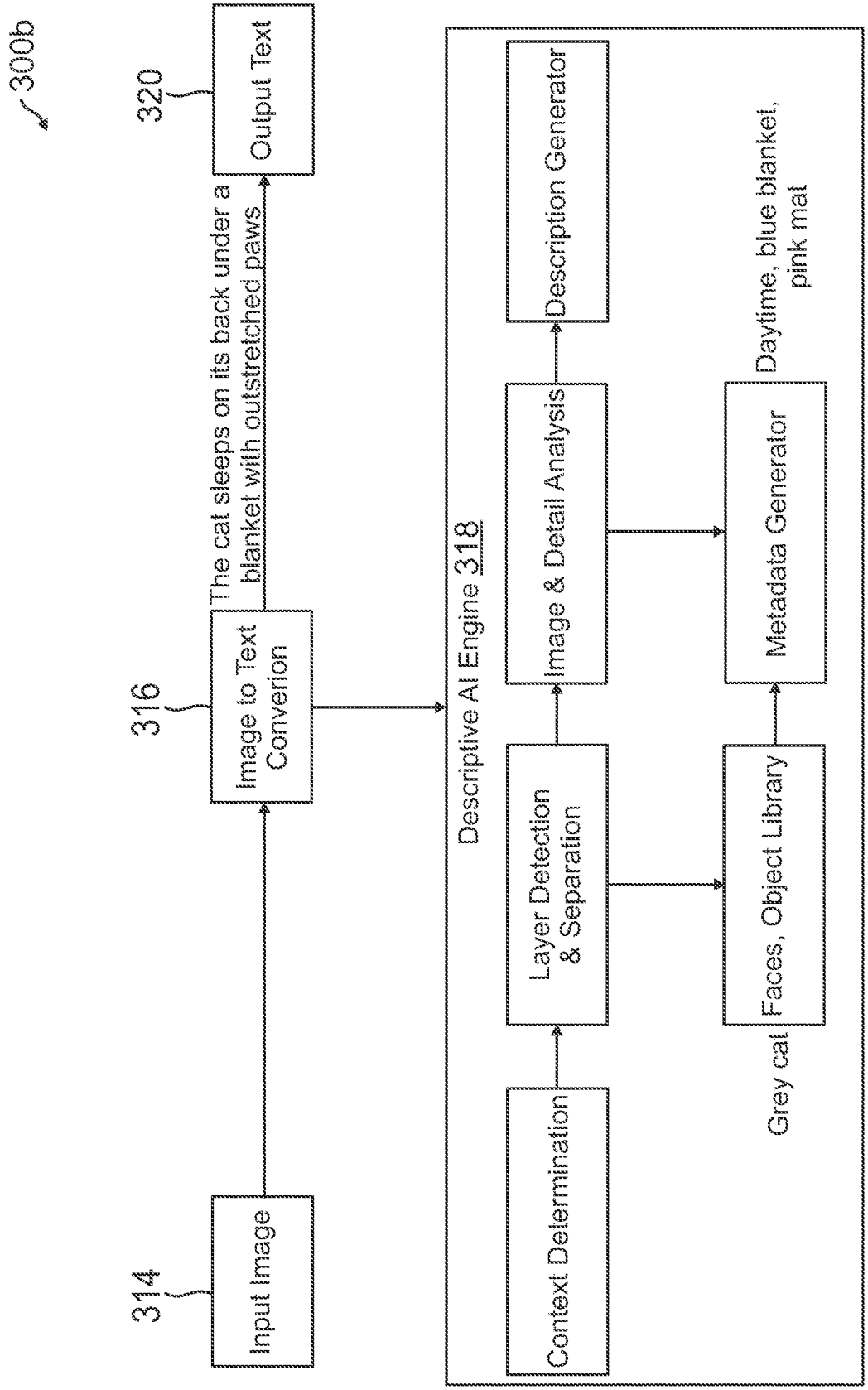

Referring now to FIG. 3B, diagram 300*b* represents an image to text conversion process and system for faster capturing and storing of image data. Initially, when input image 314 is captured and requested to be stored, or when stored with other images, a location and/or time-based AI model may compare input image 314 to other images in order to suggest a single image be captured and stored. Other images pending storage and that may be deleted or wiped after short term storage may be stored to an ephemeral storage and/or one or more images may be combined where potentially blurry and/or a larger panoramic image may be generated. Further, older similar images may be recommended for deletion to free further storage resources. Local processing of input image 314 may also occur to capture fewer or less images and/or combine images prior to storage, where server processing may then further perform operations to minimize data storage use and dark data caused by image stored and perform an image to text conversion 316 to instead store an output text 320 based on processing by a description AI engine.

For example, in diagram 300*b*, descriptive AI engine may perform dynamic mapping of common elements with stenography and image to text conversion 316 in order to reduce image data storage and instead store output text 320 having text data that utilizes less storage resources. With image to text conversion 316, descriptive AI engine 318 may utilize components to perform a context determination and identify what the image is about, who is the subject of the image, and what the image shows or includes in visual form. In this regard, descriptive AI engine 318 may include a context determination with input image 314 to determine context of the image from image and image metadata analysis. Layer detection and separation may be used to separate various visible aspects, such as subjects, persons, faces, places, objects, etc., which may be stored to a library. Image and detail analysis may then generate metadata using a metadata generator, which includes descriptive metadata tags for expose, time of day, posture, color schemes, filters, etc. Thereafter, a description generator may generate a description that informs the scene of the image in words and text in place of the image and image pixels. To reconstruct the image, metadata with faces and objects from the corresponding libraries may be used to rebuild the original.

Figure 3C:
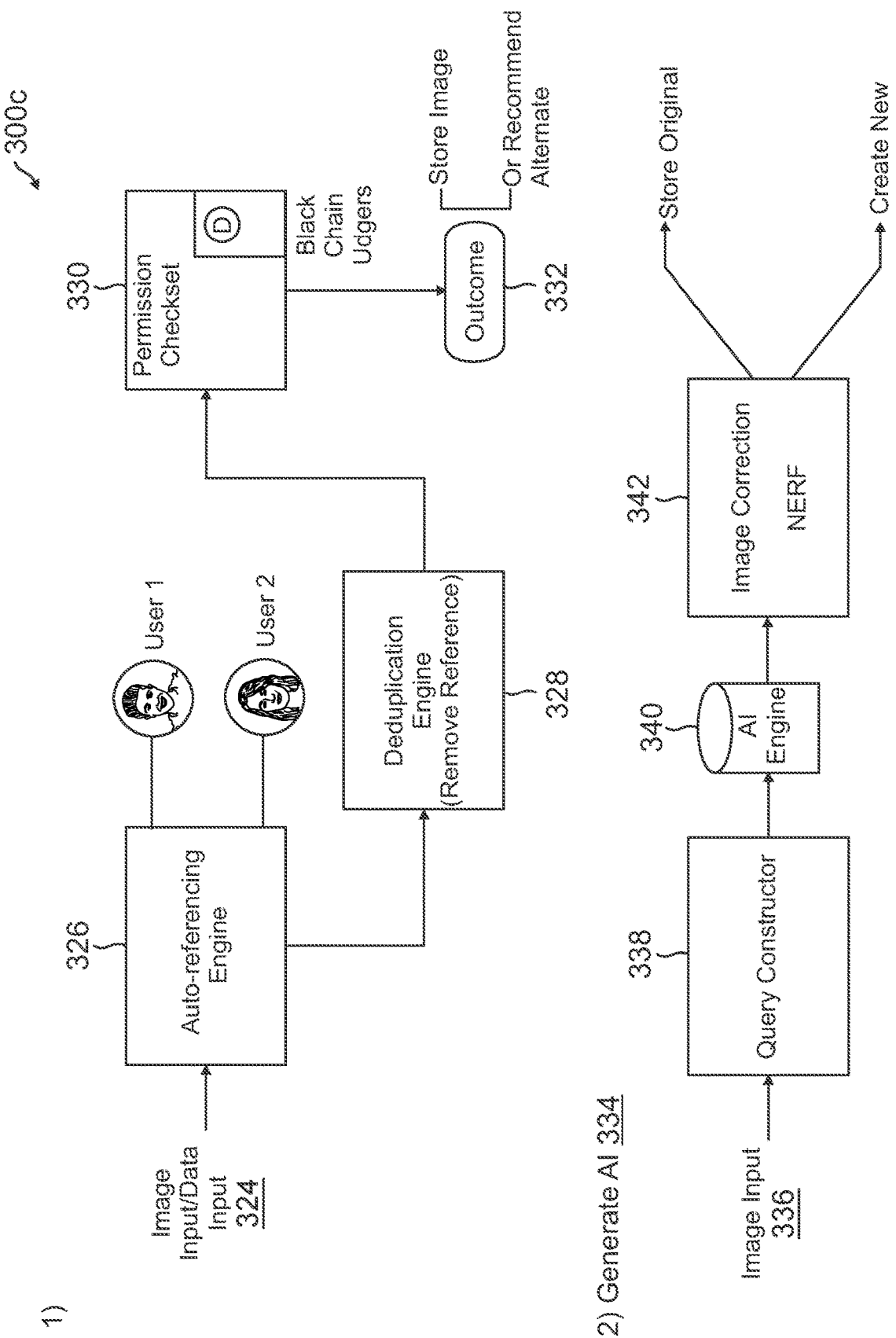

In FIG. 3C, diagram 300*c* represents two operations of a phase to store optimized data by reducing duplicate data and storing common data as shared assets accessible using permissions. Data insights may be used to determine data usability and access patterns for storage requirements, and auto-referencing may be implements where, if the same or similar file is used and/or stored in multiple instances (e.g., for different users, processing events, system components, etc.), the common object and data may be stored only once but referenced by other objects, entities, or the like with a corresponding delta based on those different references. This may allow for deduplication by replacing with references and/or shortcuts. Further, a blockchain ledger may be utilized to create common objects that may be referred to by multiple other objects, files, or entities. This use of common files may also be utilized for versioning of documents and the like in order to only store changes between versions and differentiate between minor and major versions for common object updating.

As such, in an auto-referencing engine 326, data input 324 may be received that includes common data references by a user 1 and a user 2. Deduplication engine 328 may then be invoked to create a common data object by combining or creating the shared data in an asset or object that may be shared and referenced by users 1 and 2. Permission checkset 330 may establish permissions, which may utilize a blockchain ledger for permission management and sharing of the common or shared data object. An outcome 332 may then be generated that includes whether the image is stored, or an alternate is recommended based on deduplication by combining data into a shared object with references. With generative AI 334 in diagram 300*c*, image input 336 may be processed in order to convert images to queries that are used to train an AI to reconstruct such images using available data. Data may be reduced to queries with parameters that may be regenerated if a file is needed. In this regard, a query constructor 338 may generate a query to identify image elements using an ASI engine 340, which may then regenerate an image using the parameters. Similarly, in order to further reduce data storage size when storing videos, image correction 342 may be implemented that may use a neural radiance field (NeRF) to reduce videos to images to conserve storage. The system may then determine, based on loss and whether the video may be reduced in such a manner to shared common assets with images and parameters for video reconstruction, whether a new data file or the original video may be stored.

Figure 3D:
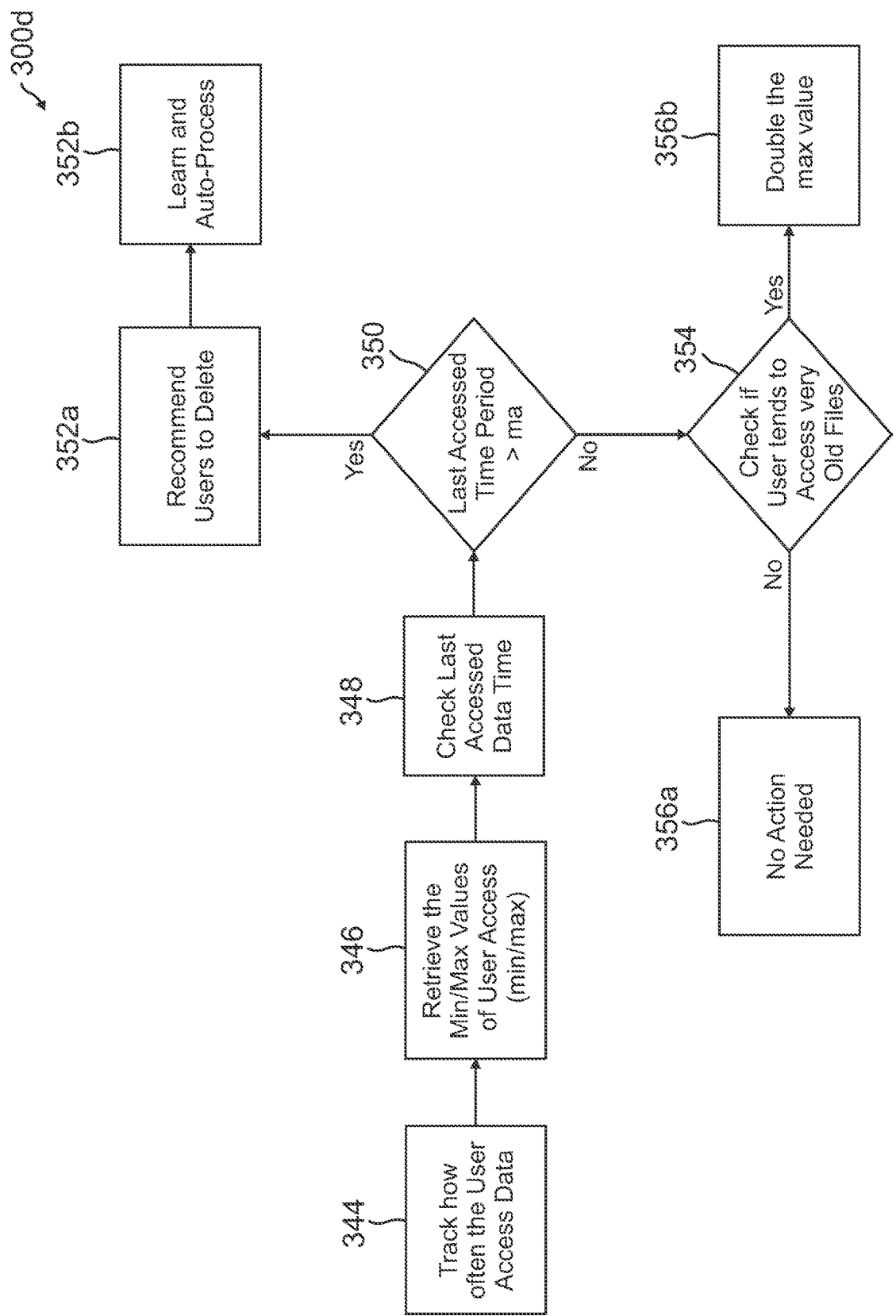
Figure 3E:
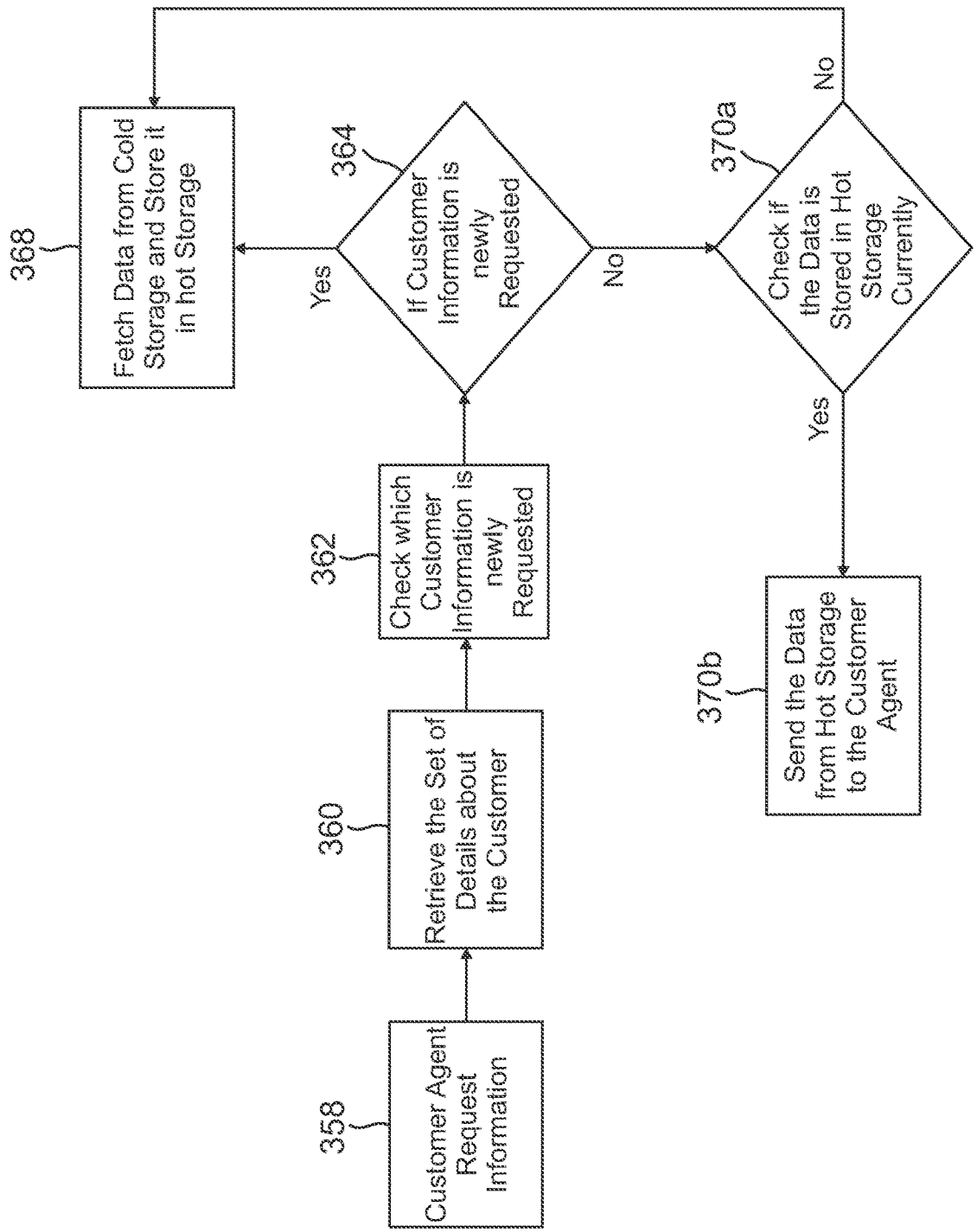

In FIGS. 3D and 3E, diagrams 300*d* and 300*e* represent changes to storage times and levels of data in order to optimize data storage use. In diagram 300*d*, operations may be performed to limit storage for extensive periods of time and/or adjust storage levels or classes when data may be moved to lower storage classes that may be more efficient or utilize less resources, but provide less data availability and/or slower access speeds. As such, user data accesses 344 may be tracked to determine how often a user accesses data, where min/max values 346 may be retrieved from the minimum and maximum values of user accesses. A last access time 348 may also be checked and determined in order to process min/max values 346. During an access check 350, if a last access time period is greater than the maximum access value, a deletion recommendation 352*a* may be transmitted to a user and an AI learning operation 352*b* may be performed to update and train AI engines on whether the data is deleted by a user and therefore correctly accessed or not. However, if the last access time period is less than the maximum user access value, then a user check 354 may be performed to determine if a user tends to access very old files. If no, a no action determination 356a may be processed and no action may be taken, but if yes, then the maximum access value may be doubled during an access value adjustment 356b.

In diagram 300e of FIG. 3E, data in cold storage may be moved to hot storage in order to meet demands of users that may more frequently access such data, such as customer agents that may access and utilize data for a service provider when acting as agents and assisting customers (e.g., account data, transaction histories, etc.). An information request 358 may first be received, and a customer details set 360 may be retrieved. Using information request 358 with customer details set 360, a customer check 362 may be performed to check customer data and histories for the customer from which information is newly being requested. A new information request determination 364 may be performed and if the information is newly requested, a cold storage data fetch 368 may access and retrieve the data from cold storage and store that data in hot storage (e.g., a data cache or other local or fast access data storage). However, if the information is not newly requested, a hot storage data check 370a may be performed. If the information in unavailable, the operations may return to cold storage data fetch 368; however, if available, the operations may proceed to a data transmission 370b of the information from hot storage to the customer agent requesting the information.

Figure 4:
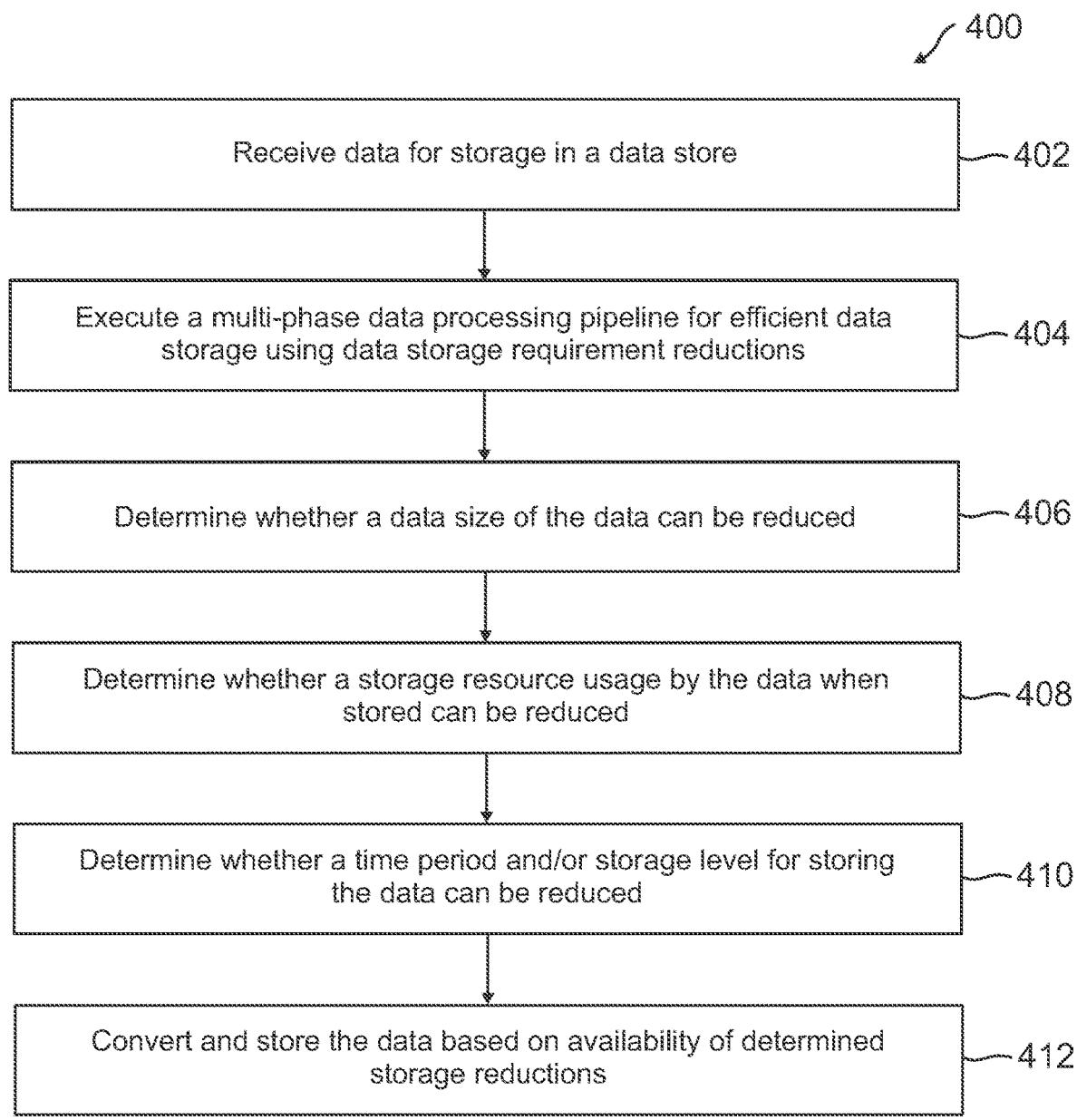
FIG. 4 is a flowchart for process utilized to provide configurable storage resource usage through a multi-phase data processing pipeline for data storage efficiency, according to an embodiment.

FIG. 4 is a flowchart 400 for process utilized to provide configurable storage resource usage through a multi-phase data processing pipeline for data storage efficiency, according to an embodiment. Note that one or more steps, processes, and methods described herein of flowchart 400 may be omitted, performed in a different sequence, or combined as desired or appropriate.

At step 402 of flowchart 400, data for storage in a data store is received. The data may be received based on a data processing operation and/or storage request associated with a user device, such as when a user device utilizes a computing service of a service provider. In further embodiments, the data may be accessed and processed after previous storage to better optimize data storage, and therefore may occur asynchronously from the initial data processing. As such, a service provider may optimize data storage use for new or existing data with their storage system and infrastructure.

At step 404, a multi-phase data processing pipeline for efficient data storage using data storage requirement reductions is executed. The multi-phase data processing pipeline may include an intelligent, modular system having different components to reduce data storage requirements and use based on size of data, duplications of existing data, and/or length of time of storage in different storage classes. At step 406, it is determined whether a data size of the data can be reduced. The multi-phase data processing pipeline may execute a first phase that may reduce storage use by capturing and store less data and in a faster manner. In the first phase, data may be stored by preventing or minimizing data that may overlap or be similar, while recommending particular data for storage in place of storing all incoming data. Further, the first phase may function to reduce data size by converting or formatting data from one type or format to another. This may include using an AI system to convert images to text data and/or text data to shorthand, which may reduce data size.

At step 408, it is determined whether a storage resource usage by the data when stored can be reduced. A second phase of the multi-phase data processing pipeline may optimize storage use by storing less data when data is found to overlap or be the same or similar between different files or objects. For example, different data objects may use the same or similar data, such as account data for an account used in different computing operations and services. Files may include overlapping data where versioning may have the same or similar data in many portions with changes to particular sections. As such, the service provider may generate, combine, and/or determine shared data and allow for references by different objects to such data. Permissions may also be established to allow different objects and users utilizing those objects access to the data when requested.

At step 410, it is determined whether a time period and/or storage level for storing the data can be reduced. Data may be designated to be stored for a particular period of time, which may be set by rules, regulations, and/or laws in some instances. However, data may be more efficiently stored at lower accessibility levels, which requires less online system resources and bandwidth for high data availability and/or at high access speeds. As such, during a third phase of the pipeline and based on how often data is accessed, a last time the data is accessed, and the like, data may be moved to different storage levels, types, or classes, such as hot, warm, or cold storage, online or offline storage, and the like. Additionally, an ephemeral storage may be used and periodically wiped to store data that may only be required to be stored for a limited amount of time or not have storage length requirements. At step 412, the data is converted and stored based on availability of the determined storage reductions. Based on the aforementioned phases and data parameters for storage, the data may be converted, formatted, or changes for more efficient storage. This may include changing the base data and/or changing the storage parameters and metadata that designates how and for how long the data is stored. As such, the service provider may more efficiently store data in an optimized manner for storage use and while minimizing dark data in the service provider's storage systems.

Figure 5:
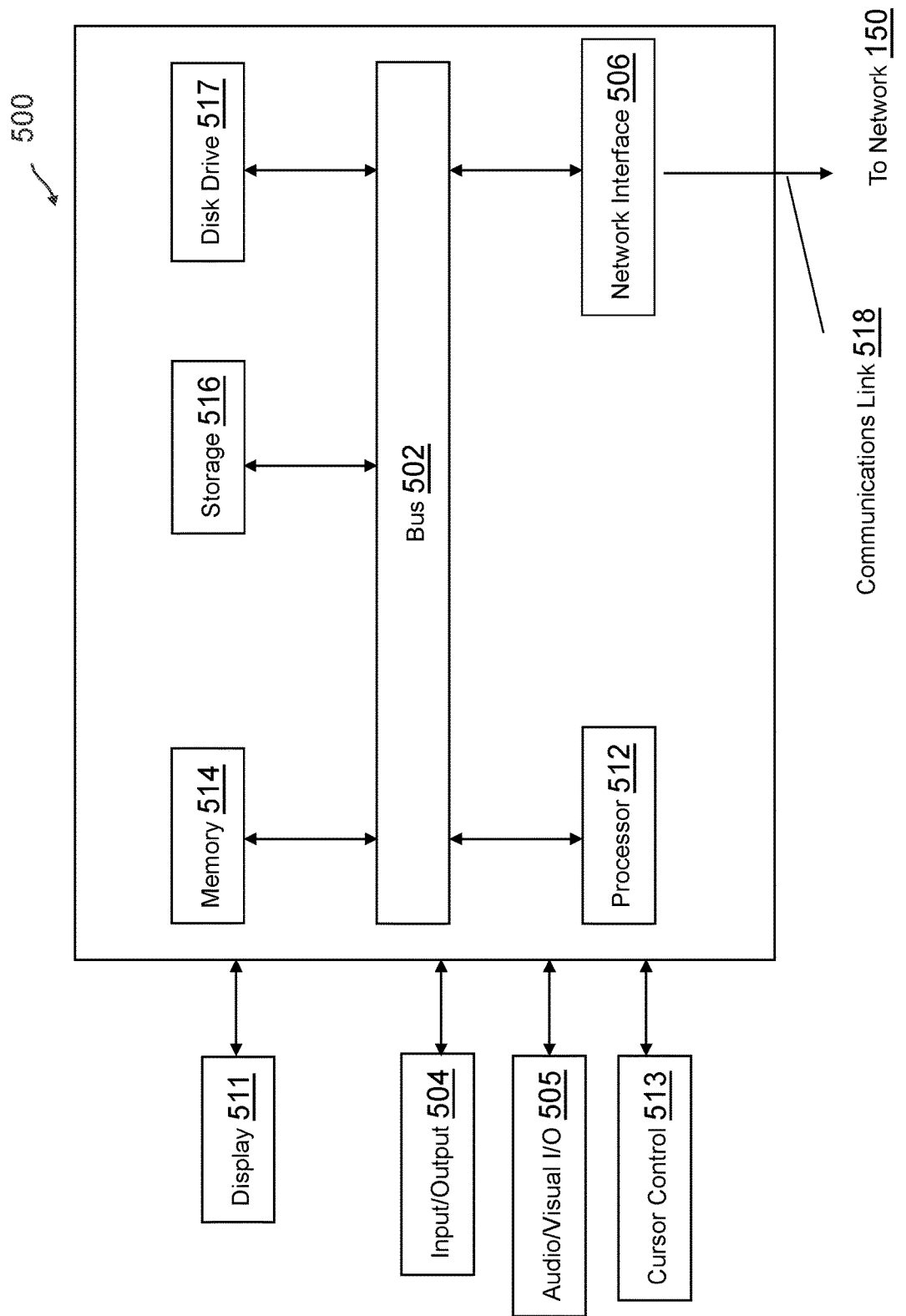
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      receiving data designated for a storage in a data store associated with the system;
      determining a first reduction in a data size for the storage of the data based on a data conversion operation for a first type of the data;
      determining a second reduction in a storage resource usage for the storage of the data based on a data deduplication operation for the data with other data stored by the data store;
      determining a third reduction in a time period for the storage of the data based on a storage level operation and an access frequency to the data;
      converting the data for the storage based on the first reduction, the second reduction, and the third reduction; and
      storing the converted data in the data store.

2. The system of claim 1, wherein data conversion operation converts the data from the first type to at least one second type that lowers the data size for the storage of the data.

3. The system of claim 2, wherein the converting the data from the first type to the at least one second type comprises:
   converting an image to at least one of text data or object data, and wherein the at least one of the text data or the object data is convertible back to the image using the data conversion operation.

4. The system of claim 1, wherein the data deduplication operation creates at least one common data file for duplicate data between the data and the other data.

5. The system of claim 4, wherein creating the at least one common data file comprises:
   generating permissions to the at least one common data file for the data and the other data;
   establishing the permissions for the data and the other data; and
   providing the at least one common data file with the permissions in place of the duplicate data in the data store.

6. The system of claim 1, wherein the storage level operation changes the time period that the data is stored by different ones of a plurality of storage levels for the data store.

7. The system of claim 6, wherein the plurality of storage levels comprise at least one of an offline cold data storage, an online hot data storage, or a storage cache.

8. The system of claim 1, wherein the operations further comprise:
receiving a query for the data;
identifying the converted data in the data store;
determining the data from the converted data; and
returning the data in response to the query.

9. The system of claim 8, wherein the determining the data from the converted data comprises reconstructing the data using the converted data and a data reconstruction operation.

10. The system of claim 9, wherein the data reconstruction operation includes substituting image data for at least one of text data or object data.

11. A method comprising:
accessing data corresponding to a storage of the data by a data store, wherein the data is associated with a user of an online service provider;
executing a multi-phase data processing pipeline of the online service provider, wherein the multi-phase data processing pipeline comprises a plurality of phases each having one or more operations for data storage efficiency optimization based on data storage reductions in the storage of the data by the data store;
determining, by the multi-phase data processing pipeline, at least one of the data storage reductions available for use with the data based on data parameters of the data and storage parameters of the data store, wherein the determining includes:
determining whether a data size of the data is available to be reduced by the data storage reductions of the multi-phase data processing pipeline,
determining whether a storage resource usage of the storage of the data by the data store is available to be reduced by the data storage reductions of the multi-phase data processing pipeline, and
determining whether a time period for the storage of the data by the data store is available to be reduced by the data storage reductions of the multi-phase data processing pipeline;
adjusting, by the multi-phase data processing pipeline, the data based on the at least one of the data storage reductions; and
storing the adjusted data in the data store.

12. The method of claim 11, wherein the determining whether the data size is available to be reduced comprises determining whether an image corresponding to the data in capable of being converted to at least one of text or a data object using the data storage reductions.

13. The method of claim 11, wherein the determining whether the storage resource usage is available to be reduced comprises:
determining whether duplicate data exists of at least a portion of the data with the data store; and
merging the at least the portion of the data with the duplicate data in a common data file having accessing permission.

14. The method of claim 13, wherein the duplicate data comprises references to a same data or a similar data or a versioning of the same data or the similar data.

15. The method of claim 11, wherein the determining whether the time period for the storage of the data by the data store is available to be reduced is based on a number of accesses of the data by one or more data assets referencing the data.

16. The method of claim 15, wherein the determining whether the time period for the storage of the data by the data store is available to be reduced is further based on a plurality of data storage levels of the storage of the data, and wherein the plurality of data storage levels.

17. A non-transitory machine-readable medium having stored thereon machine-readable instructions executable to cause a machine to perform operations comprising:
accessing data stored or to be stored by a data storage system of a service provider;
executing a multi-phase data processing pipeline comprising a first phase for a first reduction operation of a data size of the data, a second phase for a second reduction operation of duplicate data stored by the data storage system in association with the data, and a third phase for a third reduction operation of a storage length of the data by the data storage system;
determining at least one of the first reduction operation, the second reduction operation, or the third reduction option for the data using the executed multi-phase data processing pipeline and data parameters for the data;
converting the data using the at least one of the first reduction operation, the second reduction operation, or the third reduction option; and
storing the converted data.

18. The non-transitory machine-readable medium of claim 17, wherein the first phase for the first reduction operation converts at least a portion of the image to text data and object data, and wherein the text data and the object data are usable to reconstruct the at least the portion of the image.

19. The non-transitory machine-readable medium of claim 17, wherein the second phase for the second reduction operation uses common data shared between multiple data assets and permissions to the shared data by the multiple data assets.

20. The non-transitory machine-readable medium of claim 17, wherein the third phase for the third reduction operation uses a frequency of access analysis of the data or other data stored or to be stored by the data storage system.

* * * * *